United States Patent [19]

Groff

[11] Patent Number: 4,894,002

[45] Date of Patent: Jan. 16, 1990

[54] APPARATUS FOR CONFIGURING AN EXTRUDATE

[76] Inventor: E. Terry Groff, 3011 Leisz's Bridge Rd., Muhlenberg Park, Reading, Pa. 19605

[21] Appl. No.: 226,454

[22] Filed: Aug. 1, 1988

[51] Int. Cl.$^4$ ............................................. A21C 3/08
[52] U.S. Cl. .................................... 425/319; 425/320; 425/334; 425/375; 425/439
[58] Field of Search .............. 425/323, 375, 377, 319, 425/320, 439, 321, 322, 334, 336, 436 R

[56] References Cited

U.S. PATENT DOCUMENTS

| | | | |
|---|---|---|---|
| 2,071,321 | 2/1937 | Adler | 425/323 |
| 2,742,000 | 4/1956 | Hansen et al. | 425/375 |
| 2,769,407 | 11/1956 | Allen et al. | 425/323 |
| 2,988,773 | 6/1961 | Logan | 425/439 |
| 4,349,327 | 9/1982 | Balz | 425/436 R |
| 4,536,147 | 8/1985 | Groff | 425/323 |

FOREIGN PATENT DOCUMENTS 1036783  8/1958  Fed. Rep. of Germany ...... 425/323

*Primary Examiner*—Jay H. Woo
*Assistant Examiner*—K. P. Nguyen
*Attorney, Agent, or Firm*—Panitch Schwarze Jacobs & Nadel

[57] ABSTRACT

The apparatus for extruding a paste like product on to a horizontal board or plate while moving the plate relative to the extruder, and subsequently overturning the plate to deliver the configured extrudate to a removal conveyor.

7 Claims, 2 Drawing Sheets 4,894,002

APPARATUS FOR CONFIGURING AN EXTRUDATE

BACKGROUND OF THE INVENTION

While the device of the present invention has been primarily developed and used to extrude a comestible paste, or the like, it is appreciated that a wide variety of similar products may be specifically configured, as desired.

Applicant is aware of the below listed prior art:

| U.S. Pat. No. | PATENTEE |
| --- | --- |
| 1,268,003 | GRANLUND |
| 2,429,042 | BADER |
| 2,742,000 | HANSEN ET AL |
| 3,407,440 | MYERS |
| 3,494,304 | GUGLER |
| 3,632,463 | MCFARLANE |
| 3,940,226 | VERHOEVEN |
| 4,389,357 | CHU ET AL |
| 4,478,569 | GIULIO ET AL |

Probably Applicant's prior patent is the closest, disclosing multi-dimentional relative movement between an extruder and a conveyor.

While it is contemplated that the instant invention may be used on various gluing operations, including circuit boards and furniture, the device has been primarily developed and will be illustrated and described hereinafter with specific reference to food products, such as pretzels, bagels, sweet rolls, and the like.

SUMMARY OF THE INVENTION

It is an important object of the present invention to provide an extruding apparatus for comestible paste, and the like, which is capable of faster production line output than prior apparatus and method; highly versatile in operation for obtaining widely varying extrudate configurations, and which is well adapted to meet practical conditions of manufacture, maintenance and use.

Other objects of the present invention will become apparent upon reading the following specification and referring to the accompanying drawings, which form a material part of this disclosure.

The invention accordingly consists in the features of construction, combinations and arrangements of parts and method steps, which will be exemplified in the following description, and of which the scope will be indicated by the appended claims.

DESCRIPTION OF THE PREFERRED EMBODIMENT

Figure 1:
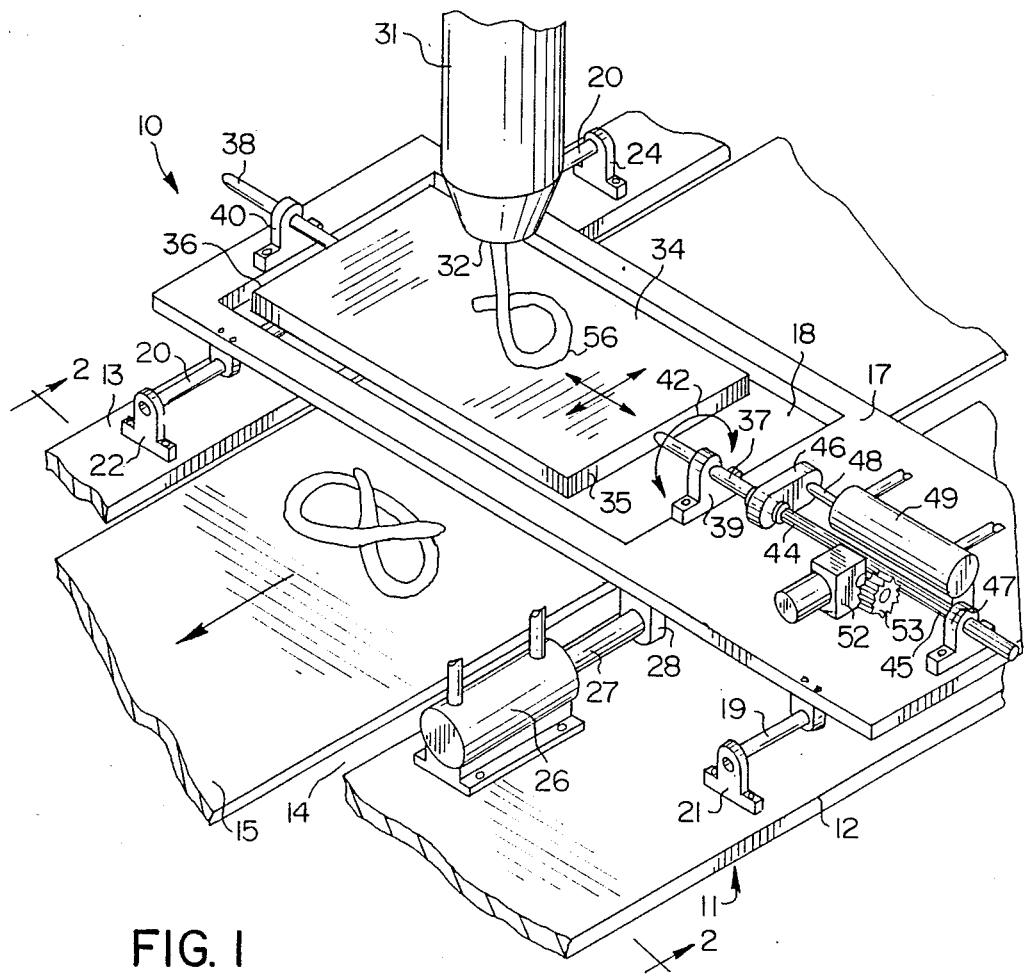
FIG. 1 is a top perspective view showing an apparatus and method of the present invention.
Figure 4:
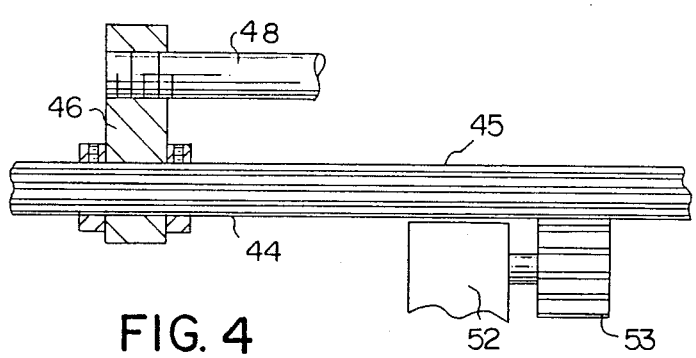
FIG. 4 is a partial sectional horizontal view taken generally along the line 4—4 of FIG. 2.
Figure 3:
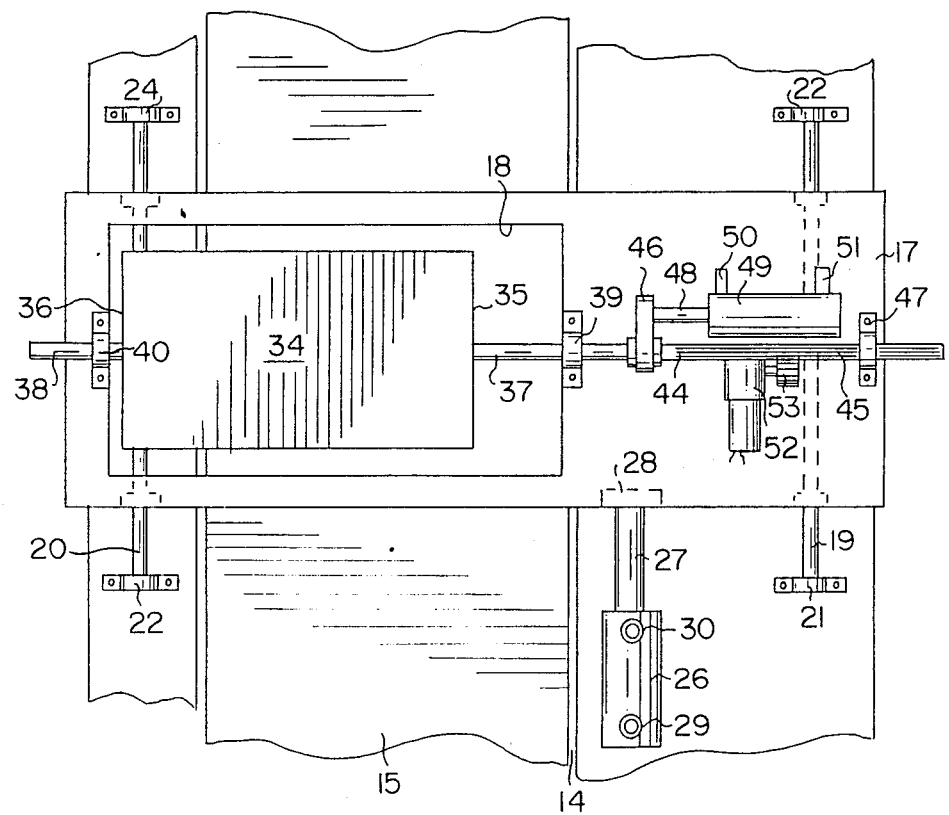
FIG. 3 is a top plan view of the apparatus of FIG. 1, absent the extruder.
Figure 2:
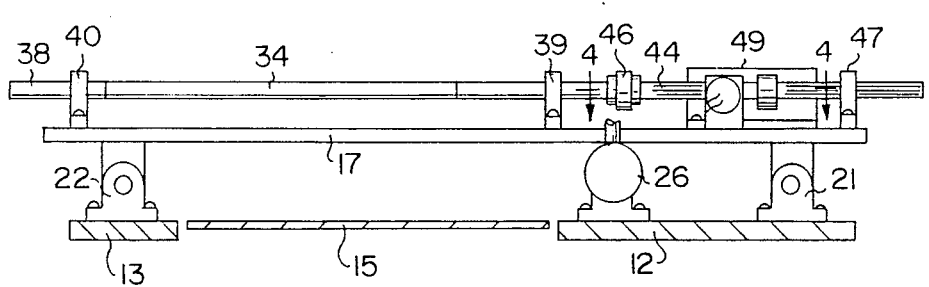
FIG. 2 is a sectional elevational view taken generally along the line 2—2 of FIG. 1.

In FIG. 1 is shown apparatus for practice of the instant invention, the apparatus is generally designated 10, and includes a generally horizontal fixed base 11, which may be composed of a pair of fixed, generally parallel, spaced, horizontal side pieces 12 and 13, on opposite sides of a longitudinal passageway 14. The passageway 14 is generally of constant width and may receive a generally horizontal conveyor run 15 suitably powered for movement along the channel or passageway 14.

Mounted on the bed 11, spaced thereover, may be a generally horizontal table or platform 17, say formed of a generally rectangular plate and having formed therein a rectangular through hole 18 located over the passageway or channel 14. The table 17 is mounted as on parallel rods or ways 19 and 20. That is, the ways 19 and 20 are parallel to each other and to the passageway 14, being fixed to the bed 12, 13, as by upstanding pedestal supports 21 and 22 for rod or way means 19, and 20. A cylinder is shown at 26 also mounted on the bed 11 and including an extensile and retractile piston rod 27 suitably secured, as by bracket 28 to table 17. Suitable fluid connections 29 and 30 are shown for applying pressure to the cylinder 26 at opposite ends thereof to effect reciprocation of the piston shaft 27 and the table 17.

Thus, the table 17 is provided with generally horizontal, reciprocating movement back and forth along and over the channel 14 and its conveyor 15. However, other means may be provided for achieving this resulting movement.

Spaced over the through opening 18 provided in the table 17 may be an extruder 31, with its nozzle or discharge end 32 facing downwardly.

Located in the opening 18 of table 17 is a generally flat support or plate 34. The plate is spaced within the opening 17, for purposes appearing presently.

Extending from opposite edges 35 and 36 of the support or plate 34 are coaxial shafts 37 and 38. Actually, the shafts 37 and 38 may be a single shaft extending generally through a medial axis of the plate 34, outwardly from opposite plate ends 35 and 36, and through respective pedestal bearings 39 and 40 upstanding from the table 17.

That is, the shaft 37 extends horizontally and generally normal to the shafts 19 and 20, the shaft 37 being longitudinally slidable in the bearings 39 and 40 to mount the plate 34 for movement along the coaxial shaft 37 normal to plate movement along the axes of shafts 19 and 20.

In addition, the plate 34 may be flipped over, or turned about the axis of shaft 37 as indicated by the arrow 42. The bearings 39 and 40 are linear, in supporting shaft 38 for longitudinal movement; and are rotary in supporting shaft 38 for axial rotation.

The shaft 37, 38 may extend beyond the pedestal bearing 39, where its extension 44 is provided with splines or teeth, as at 45 and shaft support bearings 46 and 47.

The bearing 46 may be carried by the shaft 48 of a piston-cylinder 49. Suitable pressure, such as hydraulic, or the like, may be provided at fluid connections 50 and 51 to shift the shaft 48 longitudinally and move the plate 34 transverse of movement of the table 17.

Further, a suitable rotary actuator or motor 52 carries a pinion or gear 53 in meshing engagement with the teeth 45 to rotate the shaft 37, 38 axially in a desired direction.

Extending along the channel or passageway 14 is the upper run or belt of a conveyor 15. In practice, the extruder 31 extrudes extrudate 56 downwardly on to the plate 34, while the plate is moved, say two dimensionally, as by movement of the plate relative to the table 17, and simultaneous movement of the table relative to the bed 11. This serves to specifically configure the extrudate, as desired, immediately whereupon the support member or plate 34 may be flipped over or obverted to discharge, drop or deliver a selectively configured product to the carrier or conveyor 15. In this manner, formation of the next extruded object may occur during dropping and removal of the previously formed extruded object, for a great savings in time.

Also, it is preferred that the plate 34 rotate with its underside moving in generally the same direction as the conveyor. This will minimize damage to a configured extrudate on delivery to the conveyor.

Although the present invention has been described in some detail by way of illustration and example for purposes of clarity of understanding, it is understood that certain changes and modifications may be made within the spirit of the invention.

What is claimed is:

1. Apparatus for configuring an extrusion of food, comprising an extruder discharging downwardly, a support beneath said extruder for receiving extrudate, the support having an upper side and an underside, support and extruder mounting means mounting the same for relative movement in a selected path to selectively configure the extrudate on the upper side of the support, additional support mounting means mounting said support for overturning movement to gravitationally remove the configured extrudate from the support and present the underside of the support upwardly toward the extruder for further receiving extrudate, and a receiver beneath said support for receiving the gravitationally removed configured extrudate.

2. Apparatus according to claim 1, wherein said support mounting means comprises a bed having a table mounted thereon, and carrier means interconnected between said table and said bed for allowing said table to move horizontally with respect to said bed.

3. Apparatus according to claim 2, wherein said carrier means is a pair of generally parallel rods mounted on said bed having said table slidably mounted thereon.

4. Apparatus according to claim 2, wherein said support comprises a plate rotatably mounted on said table for movement therewith and journal means positioned on said table for mounting said plate for at least 180° rotation about a horizontal axis to effect said overturning.

5. Apparatus according to claim 4, wherein said bed and table are generally horizontal, said table being spaced over said bed by said carrier means, and further comprising rotary and horizontal movement means mounted on said table and interconnected to said plate, said rotary and horizontal movement means comprising an extensile and retractile rotary shaft for moving said plate in at least one plane of horizontal movement and to effect said overturning.

6. Apparatus according to claim 1, wherein said receiver comprises a generally horizontal conveyor beneath said support.

7. Apparatus according to claim 6, wherein said conveyor being movable generally normal to the axis of said journal means, for smoothly receiving a configured extrudate from the support.

* * * * *